(12) United States Patent
Kubo et al.

(10) Patent No.: US 7,635,314 B2
(45) Date of Patent: *Dec. 22, 2009

(54) CHAIN TRANSMISSION

(75) Inventors: Aizoh Kubo, Kyoto (JP); Hiroki Ishida, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 318 days.

This patent is subject to a terminal disclaimer.

(21) Appl. No.: 11/269,002

(22) Filed: Nov. 8, 2005

(65) Prior Publication Data

US 2006/0122018 A1  Jun. 8, 2006

(30) Foreign Application Priority Data

Nov. 19, 2004  (JP) ............................. 2004-335983

(51) Int. Cl.
  *F16H 7/06*  (2006.01)
  *F16H 55/30*  (2006.01)
(52) U.S. Cl. .................... 474/156; 474/152; 474/155
(58) Field of Classification Search ................ 474/100, 474/152–156, 160, 202–203, 206
  See application file for complete search history.

(56) References Cited

U.S. PATENT DOCUMENTS

| | | | |
|---|---|---|---|
| 4,108,016 A * | 8/1978 | Muranishi ..................... 74/462 |
| 4,492,030 A * | 1/1985 | Beerens ....................... 30/384 |
| 4,607,601 A * | 8/1986 | Kohler ....................... 123/90.31 |
| 5,066,264 A * | 11/1991 | Romano ..................... 474/152 |
| 5,170,882 A | 12/1992 | Tekathen et al. |
| 5,427,582 A | 6/1995 | Iwao et al. |
| 6,036,614 A | 3/2000 | Buddaria |
| 6,375,589 B1 * | 4/2002 | Makino et al. ............... 474/148 |
| 6,637,286 B2 * | 10/2003 | Friedrich et al. ........... 74/501.6 |
| 6,736,744 B1 * | 5/2004 | Wigsten et al. .............. 474/152 |
| 7,101,296 B1 * | 9/2006 | Cass et al. ................... 474/152 |

(Continued)

FOREIGN PATENT DOCUMENTS

EP  0 021 839 A2  1/1981

(Continued)

OTHER PUBLICATIONS

U.S. Appl. No. 11/247,625, filed Oct. 11, 2005, Aizoh Kubo et al.

(Continued)

*Primary Examiner*—Robert A Siconolfi
*Assistant Examiner*—Thomas W Irvin
(74) *Attorney, Agent, or Firm*—Howson & Howson LLP

(57) ABSTRACT

In a chain transmission in which a roller chain transmits power from a driving sprocket to one or more driven sprockets, the sprocket teeth are shaped so that at a location radially outward from the sprocket pitch circle, the distance between the front surface of each sprocket tooth to a radial reference line from the sprocket center through the center of the tooth root, is at least as great as the distance from the centerline to the front tooth surface at the pitch circle. The tooth faces merge smoothly with the tooth gap bottom, the sprocket root diameter is smaller than the root diameter according to ISO standards, and the radius of the arcuate tooth gap bottom is greater than the radius of the chain roller.

1 Claim, 9 Drawing Sheets

U.S. PATENT DOCUMENTS

| | | | |
|---|---|---|---|
| 2001/0049313 A1* | 12/2001 | Rutz et al. | 474/152 |
| 2005/0009655 A1* | 1/2005 | Kubo et al. | 474/152 |
| 2006/0084542 A1* | 4/2006 | Kubo et al. | 474/206 |

FOREIGN PATENT DOCUMENTS

| | | |
|---|---|---|
| EP | 0 886 085 A1 | 12/1998 |
| EP | 1 493 946 A1 | 1/2005 |
| GB | 1 404 880 | 9/1972 |
| JP | 56-6698 | 1/1981 |
| JP | 58-203264 | 11/1983 |
| JP | 11-118024 | 4/1999 |
| JP | 3089902 | 7/2000 |

OTHER PUBLICATIONS

U.S. Appl. No. 11/264,317, M. Sonoda.

* cited by examiner

CHAIN TRANSMISSION

CROSS REFERENCE TO RELATED APPLICATION

This application claims priority on the basis of Japanese patent application 2004-335983, filed on Nov. 19, 2004. The disclosure of Japanese patent application 2004-335983 is hereby incorporated by reference.

FIELD OF THE INVENTION

This invention relates to a chain transmission used in an internal combustion engine such as a vehicle engine, and relates specifically to a chain transmission in which vertical motion of the chain, due to polygonal movement as it engages a sprocket, is suppressed.

BACKGROUND OF THE INVENTION

FIG. 8 shows a conventional chain transmission 500, in which a transmission chain 510 is engaged with a sprocket 520, having a tooth form as defined in ISO 606:1994(E). This chain transmission is described in U.S. Pat. No. 5,427,582. As shown in FIG. 9, in the conventional chain transmission 500, as the chain rollers R engage a sprocket, they contact the bottoms 522a of the gaps between sprocket teeth 522. As a result, polygonal movement of the chain is generated.

Polygonal movement of the chain causes vertical motion of the chain as it approaches and moves away from the sprocket (that is, motion of the chain in a direction transverse to its direction of travel but in the plane defined by its loop-shaped path of travel). The vertical motion induces chordal vibration in the chain, which, in turn, generates vibration noise. The vertical motion of the chain also causes impact sounds as the rollers R of the approaching portion of the chain come into engagement with the tooth gap bottom 522a on the sprocket. These impact sounds are responsible for significant amounts of noise generated in the operation of the conventional chain transmission. The polygonal motion of the chain also causes changes in speed along the direction of travel of the transmission chain, which also impairs smooth transmission of power.

Objects of this invention are to provide a chain transmission in which vertical motion of the chain, due to polygonal movement during engagement of the chain with the sprocket, is suppressed, in which changes in the speed of the chain are suppressed, and in which vibration noise and impact sounds are also suppressed so that low noise operation can be realized.

SUMMARY OF THE INVENTION

In this specification, the terms "center line" and "hypothetical reference line," are used interchangeably, and refer to an imaginary radial line extending perpendicularly to the sprocket's axis of rotation, through the sprocket's center of rotation, and intersecting the center of the root of a particular tooth. The chain transmission according to the invention comprises an endless chain and a sprocket in meshing engagement with each other The sprocket has a plurality of teeth, with tooth gaps between successive teeth. The successive teeth of the sprocket have facing front and back tooth surfaces which are continuous with, and connected to each other by, a tooth gap bottom. The front tooth surfaces face in the direction of sprocket rotation, and the tooth form of each sprocket tooth has a portion at which the distance from the center line of the tooth to the front tooth surface, at a location radially outward from the pitch circle of the sprocket, is larger than or equal to the distance from the center line at the location of the pitch circle to the intersection of the pitch circle and the front tooth surface. In addition, the root diameter of the sprocket is smaller than the root diameter of a sprocket having an ISO tooth form.

The radius of curvature of the tooth gap bottom is also larger than the radius of the roller or bushing in the transmission chain, so that the roller or bushing can move from a front tooth surface to a back tooth surface.

In the operation of the chain transmission having the above-described features, as the chain approaches the rotating sprocket, a roller (or bushing in the case of a bushing chain) moves from a front tooth surface to a back surface without coming into direct collision with a tooth gap bottom. Thus, the chain transmission of the invention avoids vertical movement the transmission chain due to polygonal movement during engagement of the chain with the sprocket. Consequently changes in the speed of the transmission chain are suppressed, and vibration noise and impact sounds are also suppressed, so that low noise operation can be realized. Furthermore, since the rollers or bushings of the chain become engaged with back tooth surfaces as they travel while in engagement with the sprocket, the rollers or bushings can smoothly disengage the sprocket.

Although the chain transmission according to the invention preferably uses a roller chain, any of various other type of chains can be used, including chains in which bushings engage the sprocket teeth, offset type chains, seal chains, and the like.

Furthermore, as will be apparent from the following detailed description, the advantages of the invention can be realized in chain transmissions with sprockets having various different tooth forms. For example, the tooth form may be one in which substantially concave tooth face surfaces are symmetrically formed on both sides of a hypothetical reference line connecting the center of the sprocket and the center of the root of the sprocket tooth. Alternatively, a tooth form in which symmetrical concave tooth face surfaces are formed on the portions of the teeth radially inward from the pitch circle, but substantially convex tooth face surfaces are symmetrically formed with respect to the hypothetical reference line on the portions of the teeth outside the pitch circle. In still another embodiment, the portions of the tooth faces radially outward from the pitch circle may be in the form of parallel planes on both sides of the hypothetical reference line. In still another embodiment, the tooth surfaces may be asymmetrical with respect to the hypothetical reference line, one tooth surface being substantially concave, and the other tooth surface being substantially the same as that of a tooth having an ISO tooth form.

The chain transmission according to the invention may be used not only as a valve timing transmission in an engine, but also as a power transmission in any of various power drives, including, for example, vehicle transmissions and the like.

DETAILED DESCRIPTION OF THE PREFERRED EMBODIMENTS

Figure 1:
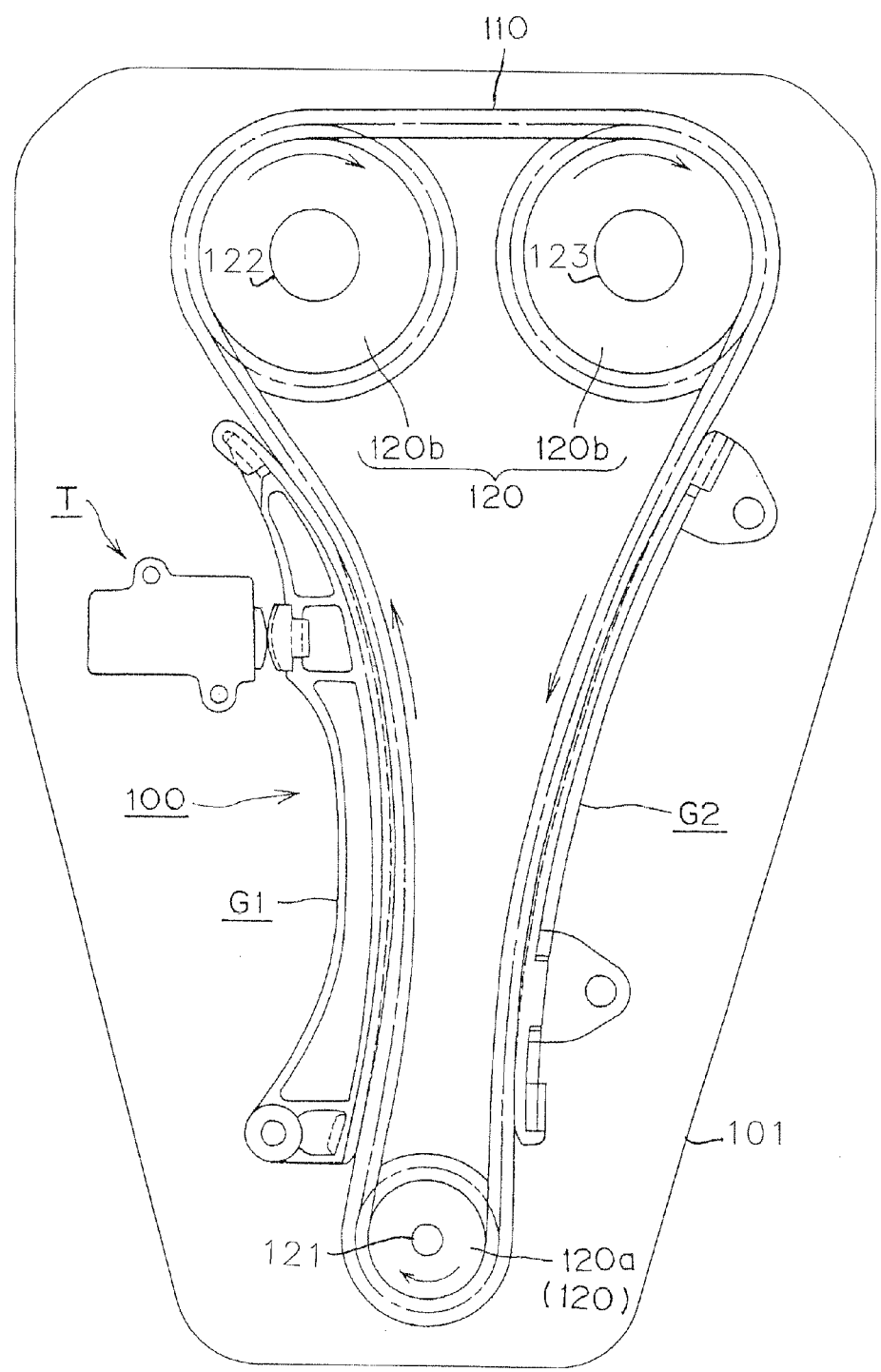
FIG. 1 is schematic elevational view of a chain transmission in accordance with the invention, used as a timing transmission in an internal combustion engine.

The chain transmission 100, shown in FIG. 1, is a timing transmission used to operate the intake and exhaust valves of a DOHC vehicle engine 101, and is composed of a roller chain 110, and a set of sprockets 120, including a driving sprocket 120a on the engine crankshaft 121, and two driven sprockets 120b, respectively on an intake valve camshaft 122 and an exhaust valve camshaft 123. As noted previously, although a roller chain is shown, the chain can be a bushing chain, an offset type chain, a seal chain, or the like. A tensioner T controls tension in chain 110 by pressing against the back of a pivoted guide G1 on which the slack side of the chain slides, and the tension side of the chain slides on a fixed guide G2.

Figure 2:
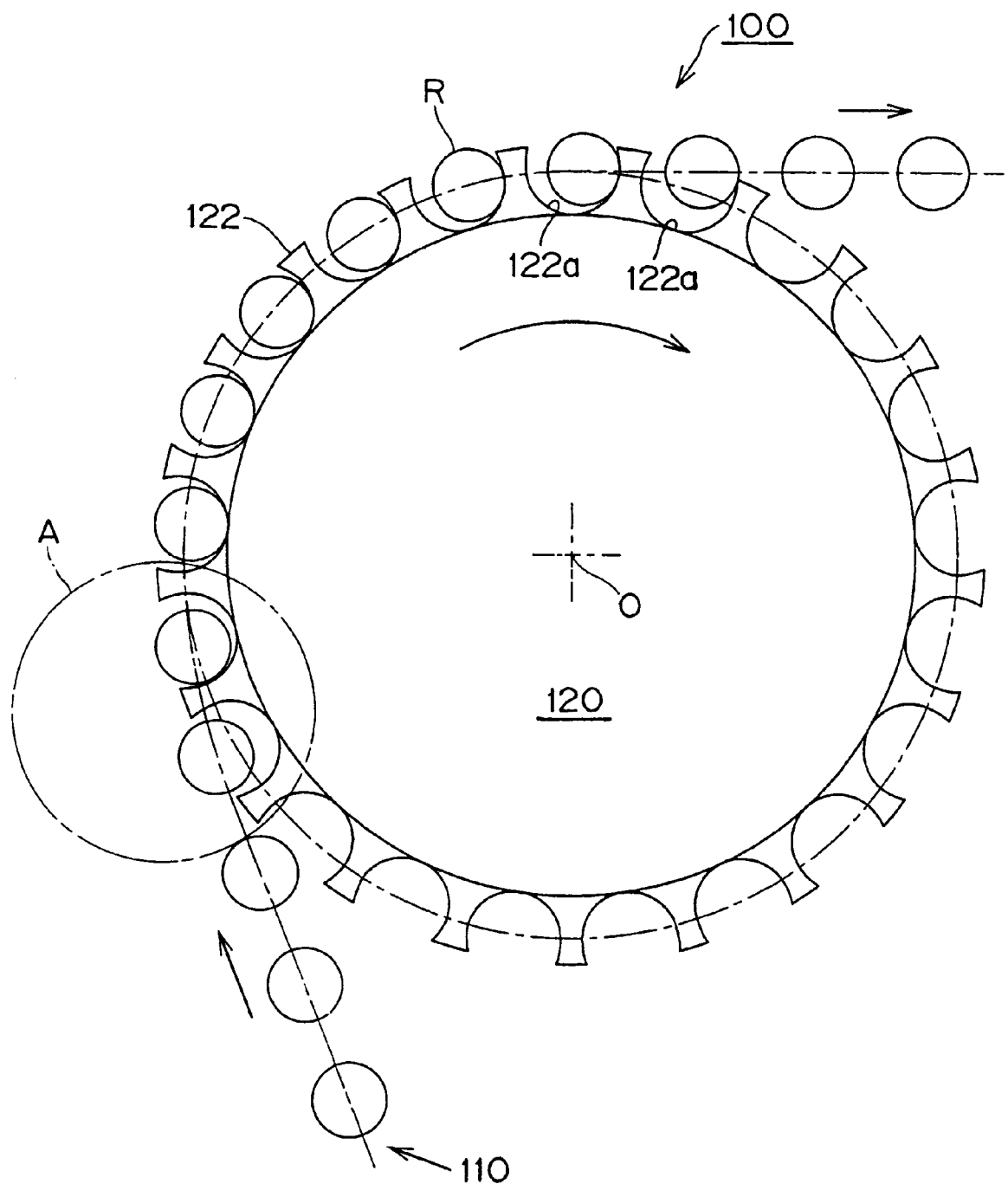
FIG. 2 is a schematic elevational view showing the engagement of the chain with one of the sprockets in FIG. 1.
Figure 3:
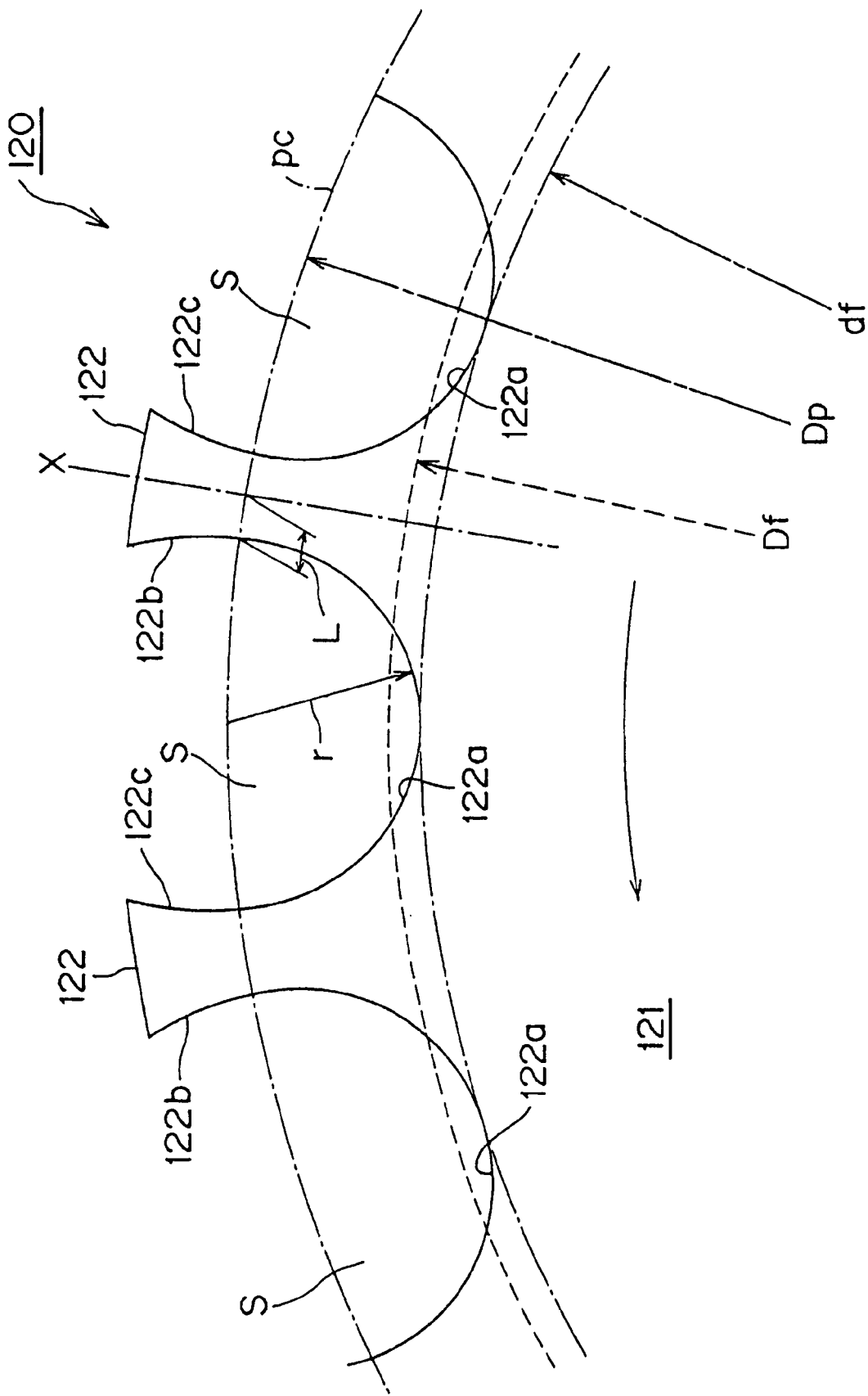
FIG. 3 is an enlarged view of sprocket teeth of a sprocket in a chain transmission according to a first embodiment of the invention.

In the sprocket 120, as shown in FIGS. 2 and 3, sprocket teeth 122 are formed on a sprocket body 121. Each tooth has a front tooth surface 122b, facing in the direction of sprocket rotation, and a back tooth surface 122c facing in the opposite direction. The front surface of each tooth faces the back surface of a preceding tooth, and the facing front and back tooth surfaces are smoothly continuous with a tooth gap bottom 122a.

As shown in FIG. 3, a front surface 122b of a sprocket tooth 122 and the back surface 122c of the same sprocket tooth are symmetrical with respect to a hypothetical reference line X, extending radially from the rotational center O (FIG. 2) of the sprocket body 121 and through the center of the root of the sprocket tooth. Both the front tooth surface 122b and the back tooth surface 122c have a substantially concave, curved shape. The tooth gap bottoms 122a are arc shaped, each having a radius r centered on the pitch circle pc. Each arcuate tooth gap bottom is smoothly continuous with a front tooth surface 122b of one tooth, and with a facing back tooth surface 122c of an adjacent preceding tooth.

The distance from the hypothetical reference line X to the front tooth surface 122b, at locations radially outward from the pitch circle pc, is greater than the distance L, measured from the point of intersection of the pitch circle pc with the hypothetical reference line X to the intersection of the pitch circle with the front tooth surface 122b. In this embodiment, because the teeth are symmetrical, the relationship between the reference line and the back tooth surface 122c is the same as the relationship between the reference line and the front tooth surface. As shown in FIG. 3, the root diameter df, defined as the diameter of a circle tangent to the tooth gap bottoms, is smaller than the root diameter Df of a sprocket having an ISO tooth form. That is, the relationship df<Df is satisfied. Moreover, the radius r of the arcuate tooth gap bottom is greater than the radius of a roller of the transmission chain 110, so that the roller can move from a front tooth surface to a back tooth surface as it travels around the sprocket.

The ISO tooth form, according to ISO Standard ISO 606: 1994(E), is one in which the root diameter df, conforms with the formula df=d−d1, where d is the pitch diameter, and d1 is the roller diameter. The root diameter df of a sprocket in this invention is considered to be smaller than the root diameter of a sprocket having an ISO tooth form if it is less than an amount equal to d−d1, less the maximum tolerance as prescribed ISO standards 606 and 286-2. The relevant ISO standards are set forth in the attached tables 1 and 2.

Figure 4:
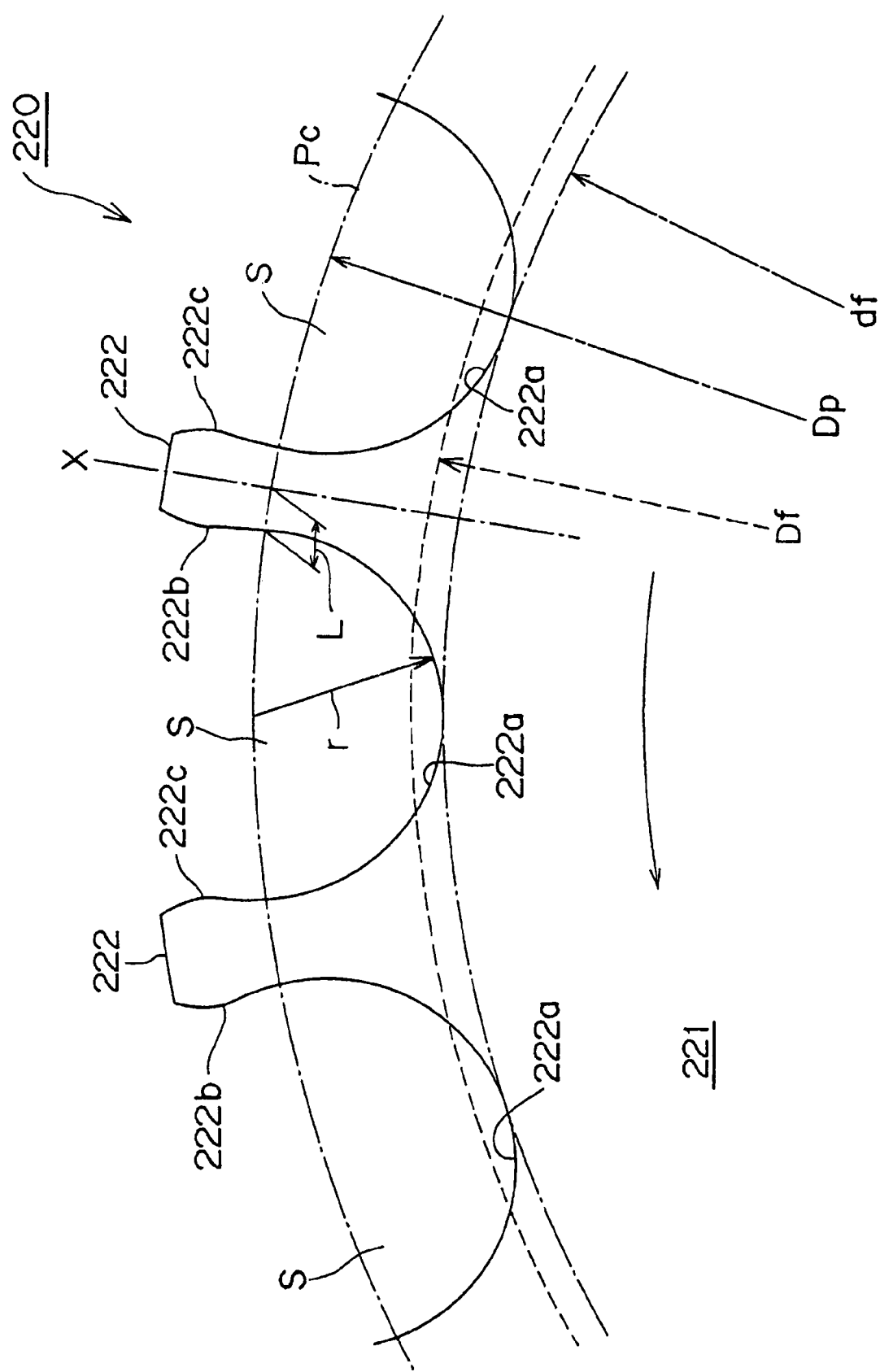
FIG. 4 is an enlarged view of sprocket teeth of a sprocket in a chain transmission according to a second embodiment of the invention.
Figure 5:
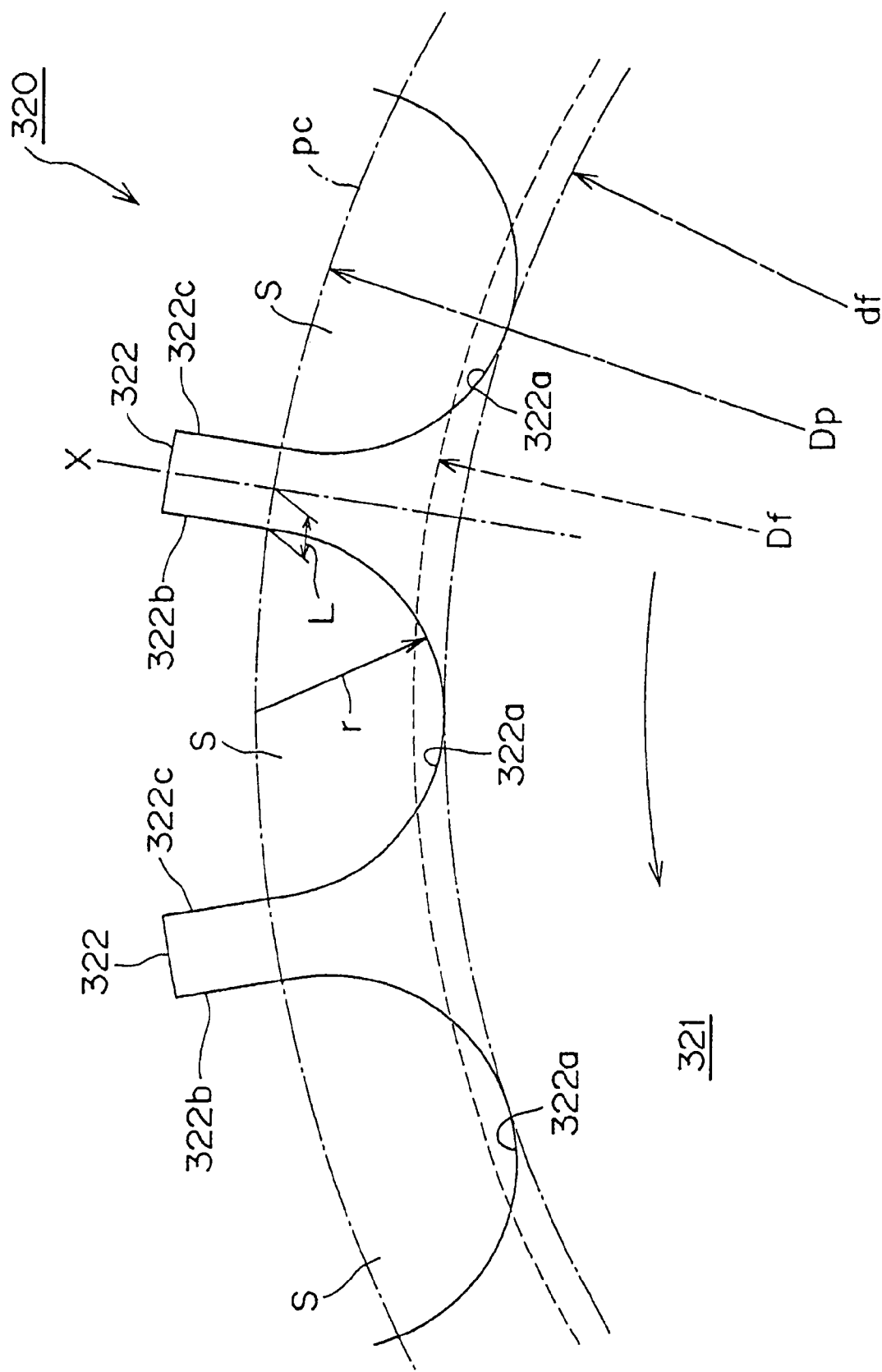
FIG. 5 is an enlarged view of sprocket teeth of a sprocket in a chain transmission according to a third embodiment of the invention.
Figure 6:
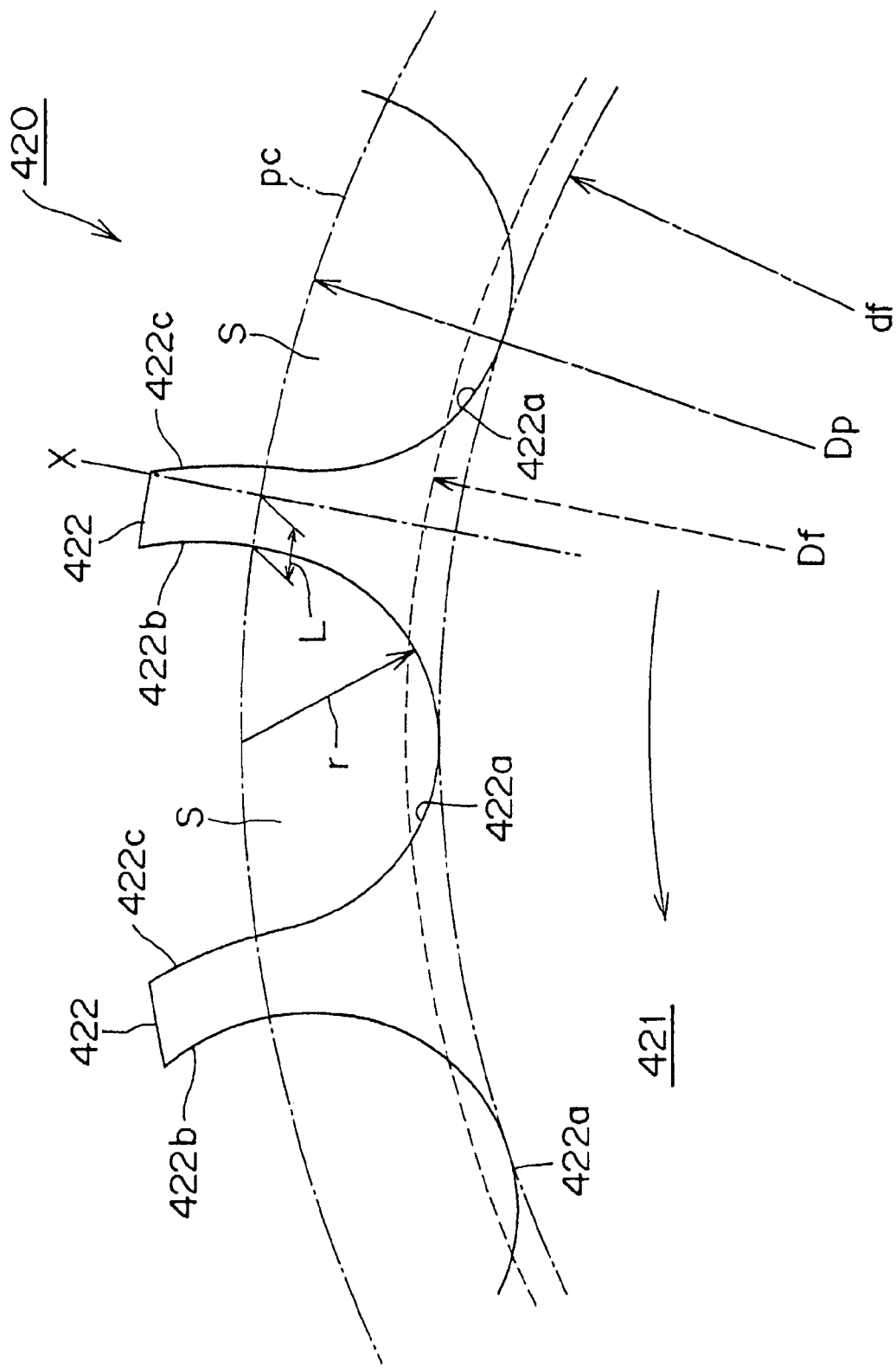
FIG. 6 is an enlarged view of sprocket teeth of a sprocket in a chain transmission according to a fourth embodiment of the invention.

Modified versions of the sprocket 120 are shown in FIGS. 4, 5 and 6. In each case, the basic operation and effects are substantially the same as in the case of sprocket 120.

The teeth 222 of sprocket 220, are formed on sprocket body 221. These teeth have front tooth surfaces 222b facing in the direction of sprocket rotation sprocket, and back tooth surfaces 222c facing in the opposite direction. The front surface of each tooth faces the back surface of a next preceding tooth, and the facing front and back surfaces are smoothly continuous with arcuate tooth gap bottom 222a. In each tooth, the front tooth surface 222b and the back tooth surface 222c are symmetrical with respect to a hypothetical reference line X, extending radially from the center of the sprocket body 221 through the center of the root sprocket tooth 222. The portions of the front and back tooth surfaces 222b and 222c, located radially outward from the pitch circle, are convex. The convex portions meet concave parts of the tooth surfaces substantially at the location of the pitch circle. The tooth gap bottom 222a is arc-shaped, having a radius r.

As in the case of the embodiment shown in FIG. 3, in the embodiment shown in FIG. 4, the distance from the hypothetical reference line X to the front tooth surface 222b, at locations radially outward from the pitch circle pc, is greater than the distance L, measured from the point of intersection of the pitch circle pc with the hypothetical reference line X to the intersection of the pitch circle with the front tooth surface 222b. Here again, because the teeth are symmetrical, the relationship between the reference line and the back tooth surface 222c is the same as the relationship between the reference line and the front tooth surface. As in the case of FIG. 3, the root diameter df is smaller than the root diameter Df of a sprocket having an ISO tooth form, and the radius r of the arcuate tooth gap bottom is greater than the radius of a roller of the transmission chain, so that the roller can move from a front tooth surface to a back tooth surface as it travels around the sprocket.

In sprocket 320, as shown in FIG. 5, the teeth 322, formed on sprocket body 321, have front tooth surfaces 322b and back tooth surfaces 322c, which are continuous with arcuate tooth gap bottoms 322a. In each tooth, the parts of the front and back tooth surfaces 322b and 322c that are located radially outward from the pitch circle pc, are in the form of planes, parallel to each other and parallel to, and symmetrical with respect to, the hypothetical reference line X, extending radially from the sprocket center through the center of the root of the sprocket tooth. As in FIGS. 3 and 4, the tooth gap bottom 322a is in the form of an arc having a radius r.

In the embodiment shown in FIG. 5, the distance from the hypothetical reference line X to the front tooth surface 322b, at locations radially outward from the pitch circle pc, is the same as the distance L, measured from the point of intersection of the pitch circle pc with the hypothetical reference line X to the intersection of the pitch circle with the front tooth surface 322b. Here again, because the teeth are symmetrical, the relationship between the reference line and the back tooth surface 322c is the same as the relationship between the reference line and the front tooth surface. As in the case of FIGS. 3 and 4, the root diameter df is smaller than the root diameter Df of a sprocket having an ISO tooth form, and the radius r of the arcuate tooth gap bottom is greater than the radius of a roller of the transmission chain, so that the roller can move from a front tooth surface to a back tooth surface as it travels around the sprocket.

In sprocket 420, as shown in FIG. 6, the teeth 422, provided on sprocket body 421, have front tooth surfaces 422b and back tooth surfaces 422c. The front and back tooth surfaces are smoothly continuous with arcuate tooth gap bottom 422a.

In the sprocket of FIG. 6, each tooth is asymmetrical with respect to the hypothetical reference line X, extending radially from the sprocket center line through the center of the root of the tooth. The front tooth surface 422b is a concave curved surface, and the distance from the hypothetical reference line X to the front tooth surface 422b, at locations radially outward from the pitch circle pc, is greater than the distance L, measured from the point of intersection of the pitch circle pc with the hypothetical reference line X to the intersection of the pitch circle with the front tooth surface 422b. However, the form of the back tooth surface is convex, and corresponds to the ISO tooth form. As in the case of FIGS. 3, 4 and 5, the root diameter df is smaller than the root diameter Df of a sprocket having an ISO tooth form, and the radius r of the arcuate tooth gap bottom is greater than the radius of a roller of the transmission chain, so that the roller can move from a front tooth surface to a back tooth surface as it travels around the sprocket.

The several embodiments described above operate similarly, and the operation will be described with reference to FIGS. 2, 3 and 7.

Figure 7:
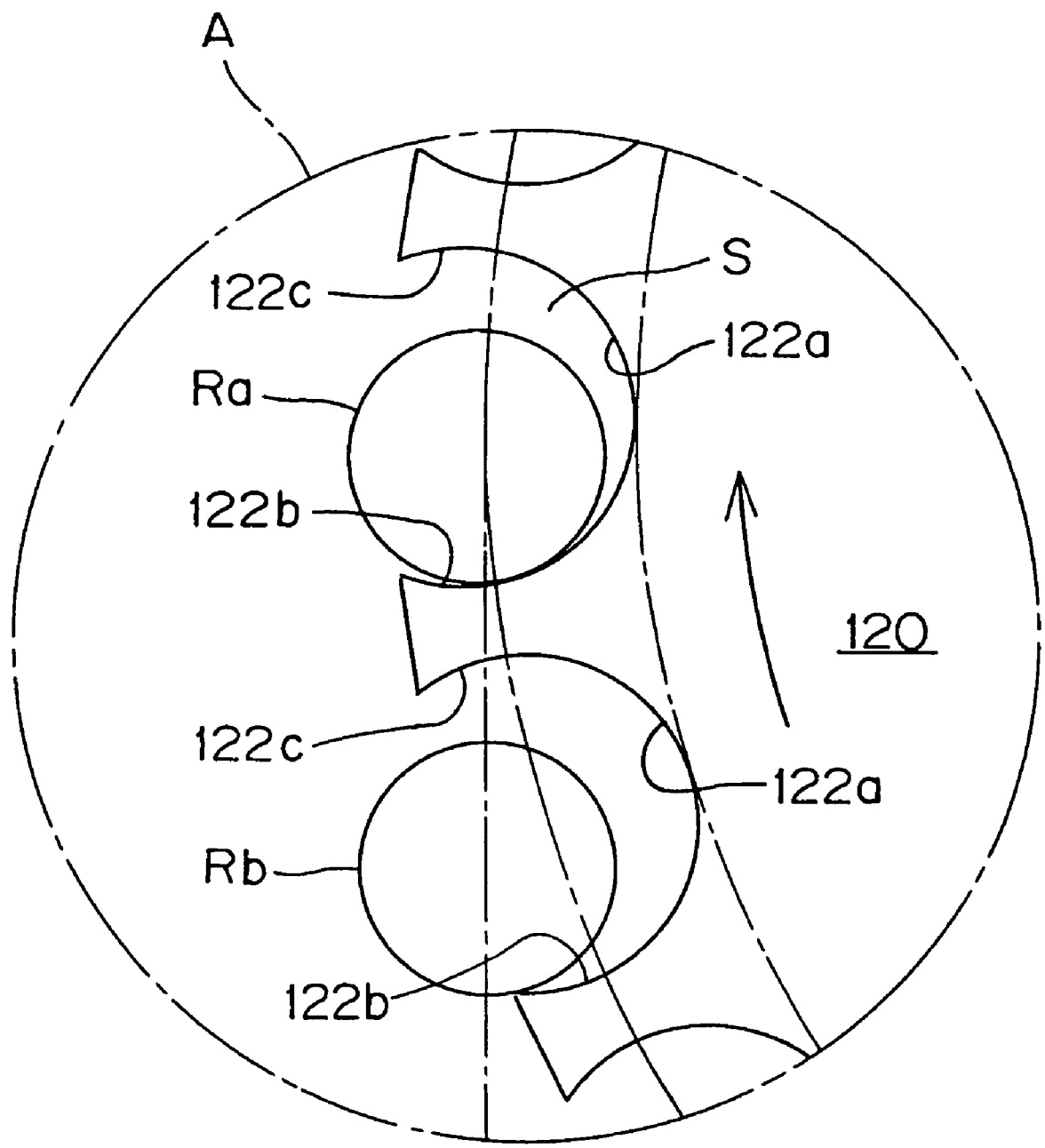
FIG. 7 is an enlarged view of the area designated "A" in FIG. 2, showing the engagement of the chain with the sprocket teeth.
Figure 8:
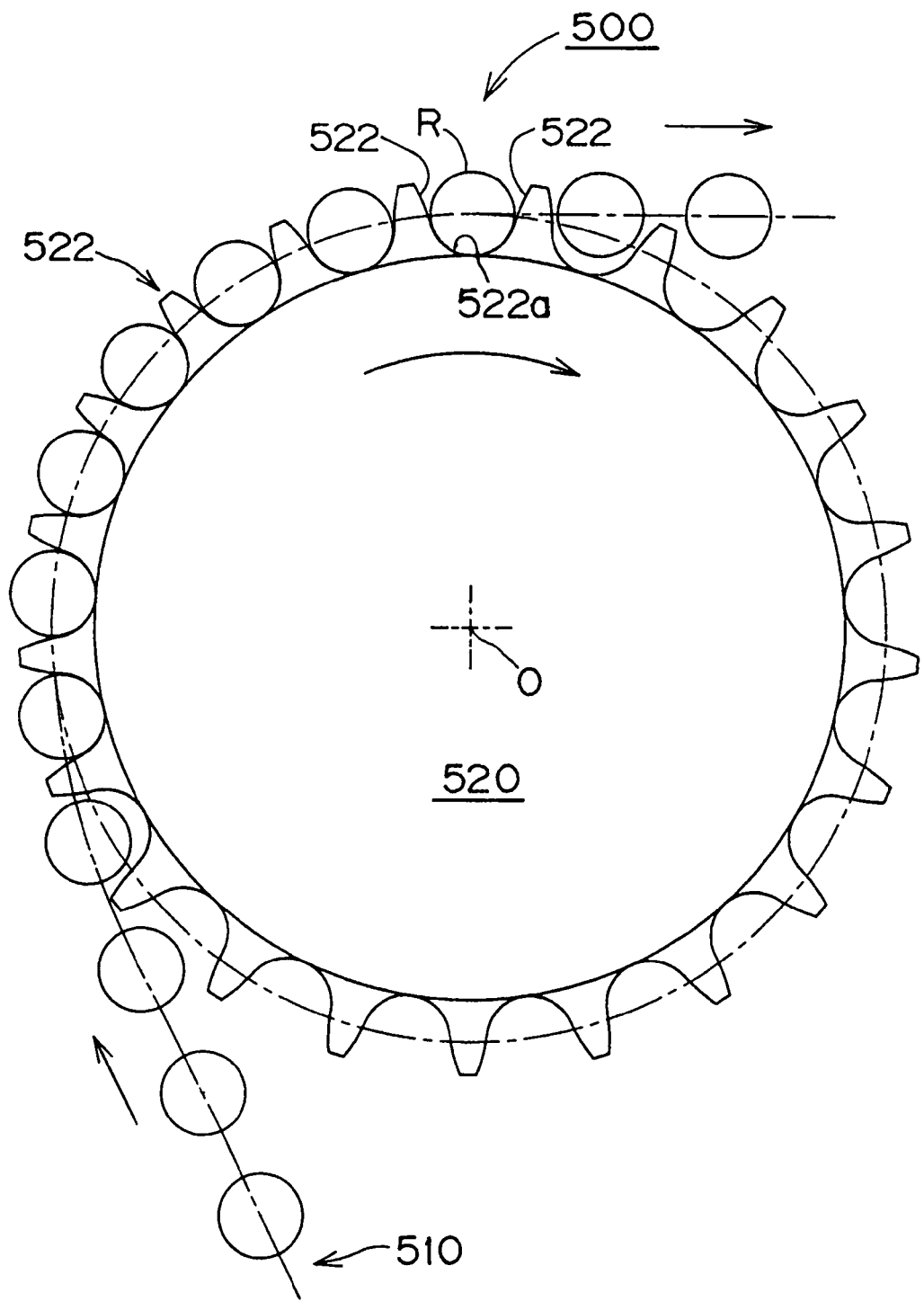
FIG. 8 is a schematic elevational view showing the engagement of a chain with a sprocket in a conventional chain transmission.
Figure 9:
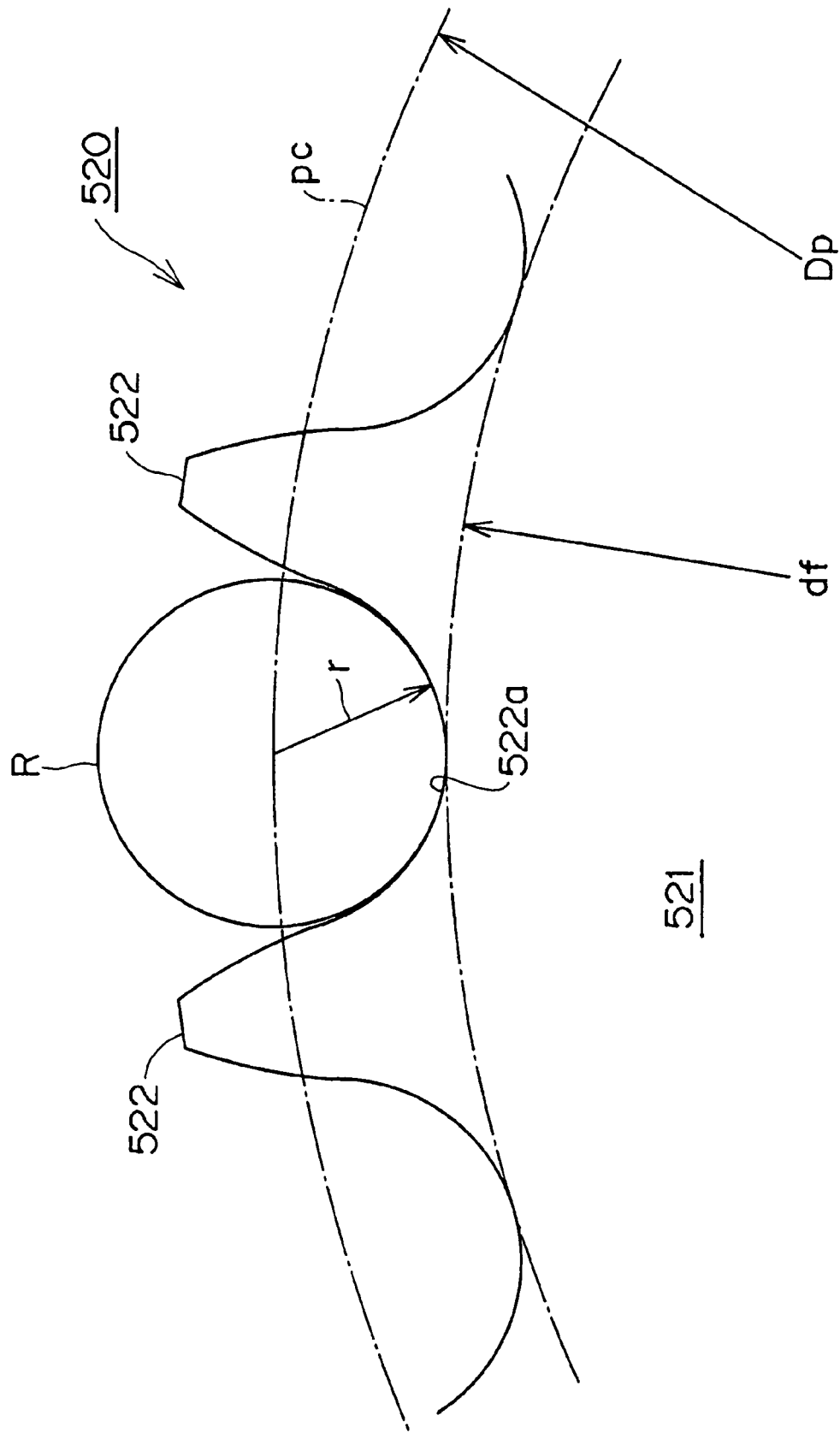
FIG. 9 is an enlarged view showing the engagement of the chain with the sprocket teeth in FIG. 8.

As shown in FIG. 7, when the sprocket 120 is rotated clockwise, a roller Ra of the transmission chain 110 moves into a tooth gap S formed between a front tooth surface 122b, and the facing back tooth surface 122c of a preceding tooth, both tooth surfaces being continuous with a tooth gap bottom 122a between them. As roller Ra enters the tooth gap, it engages a front tooth surface 122b, as shown in FIG. 7. The preceding roller Rb has already been engaged with a front tooth surface 122b of a preceding sprocket tooth. At this time, the roller Rb rolls on the front surface of the tooth with which it is engaged toward the tooth gap bottom. However, because the roller rolls along the front surface of th tooth, it avoids impact with the tooth gap bottom 122a, and the production of an impact sound resulting from direct collision between the roller and the tooth gap bottom is avoided. The other rollers engage, and roll on, front tooth surfaces in a similar manner. As shown in FIG. 2, as the rollers of the chain travel around the sprocket, the rollers move from the front tooth surfaces to the back tooth surfaces.

In the chain transmission according to the invention, vertical motion of the chain is significantly reduced, and changes in speed due to vertical motion of the chain 110 are suppressed, and vibration noise and impact sounds are avoided so that low noise operation can be realized. Furthermore, even if changes in the chain and sprocket occur over time, due to wear, the reduction in speed changes and suppression of noise can be realized for a long time.

The avoidance of impact between the chain rollers and the tooth gap bottoms prevents fatigue fracture in the chain, so that the endurance of the chain transmission is significantly improved. Moreover, the energy loss that accompanies collision between the tooth surfaces and the chain is reduced, and consequently power transmission efficiency is improved.

TABLE 1

| Tolerance limits for root diameter | | |
|---|---|---|
| Root diameter, $d_f$ mm | Upper deviation | Lower deviation |
| $d_f \leq 127$ | 0 | 0.25 mm |
| $127 < d_f \leq 250$ | 0 | 0.3 mm |
| $d_f > 250$ | 0 | h11[1] |

[1]See ISO 286-2.

TABLE 2

| | | Limit deviations for shafts h Upper limit deviation = es Lower limit deviation = ei | | | | | | | | | | | | | | | | | |
|---|---|---|---|---|---|---|---|---|---|---|---|---|---|---|---|---|---|---|---|
| Basic size mm | | h | | | | | | | | | | | | | | | | | |
| | Up to and in- | 1 | 2 | 3 | 4 | 5 | 6 | 7 | 8 | 9 | 10 | 11 | 12 | 13 | 14[1] | 15[1] | 16[1] | 17 | 18 |
| | | | | | | | | | | Deviations | | | | | | | | | |
| Above | cluding | | | | | μm | | | | | | | | | | | mm | | |
| — | 3[1] | 0 | 0 | 0 | 0 | 0 | 0 | 0 | 0 | 0 | 0 | 0 | 0 | 0 | 0 | 0 | 0 | | |
| | | −0.8 | −1.2 | −2 | −3 | −4 | −6 | −10 | −14 | −25 | −40 | −60 | −0.1 | −0.14 | −0.25 | −0.4 | −0.6 | | |
| 3 | 6 | 0 | 0 | 0 | 0 | 0 | 0 | 0 | 0 | 0 | 0 | 0 | 0 | 0 | 0 | 0 | 0 | 0 | 0 |
| | | −1 | −1.5 | −2.5 | −4 | −5 | −8 | −12 | −18 | −30 | −48 | −75 | −0.12 | −0.18 | −0.3 | −0.48 | −0.75 | −1.2 | −1.8 |
| 6 | 10 | 0 | 0 | 0 | 0 | 0 | 0 | 0 | 0 | 0 | 0 | 0 | 0 | 0 | 0 | 0 | 0 | 0 | 0 |
| | | −1 | −1.5 | −2.5 | −4 | −6 | −9 | −15 | −22 | −36 | −58 | −90 | −0.15 | −0.22 | −0.36 | −0.58 | −0.9 | −1.5 | −2.2 |
| 10 | 18 | 0 | 0 | 0 | 0 | 0 | 0 | 0 | 0 | 0 | 0 | 0 | 0 | 0 | 0 | 0 | 0 | 0 | 0 |
| | | −1.2 | −2 | −3 | −5 | −8 | −11 | −18 | −27 | −43 | −70 | −110 | −0.18 | −0.27 | −0.43 | −0.7 | −1.1 | −1.8 | −2.7 |
| 18 | 30 | 0 | 0 | 0 | 0 | 0 | 0 | 0 | 0 | 0 | 0 | 0 | 0 | 0 | 0 | 0 | 0 | 0 | 0 |
| | | −1.5 | −2.5 | −4 | −6 | −9 | −13 | −21 | −33 | −52 | −84 | −130 | −0.21 | −0.33 | −0.52 | −0.84 | −1.3 | −2.1 | 3.4 |
| 30 | 50 | 0 | 0 | 0 | 0 | 0 | 0 | 0 | 0 | 0 | 0 | 0 | 0 | 0 | 0 | 0 | 0 | 0 | 0 |
| | | −1.5 | −2.5 | −4 | −7 | −11 | −16 | −25 | −39 | −62 | −100 | −160 | −0.25 | −0.39 | −0.62 | −1 | −1.6 | −2.5 | −3.9 |
| 50 | 80 | 0 | 0 | 0 | 0 | 0 | 0 | 0 | 0 | 0 | 0 | 0 | 0 | 0 | 0 | 0 | 0 | 0 | 0 |
| | | −2 | −3 | −5 | −8 | −13 | −19 | −30 | −46 | −74 | −120 | −190 | −0.3 | −0.46 | −0.74 | −1.2 | −1.9 | −3 | −4.6 |
| 80 | 120 | 0 | 0 | 0 | 0 | 0 | 0 | 0 | 0 | 0 | 0 | 0 | 0 | 0 | 0 | 0 | 0 | 0 | 0 |
| | | −2.5 | −4 | −6 | −10 | −15 | −22 | −35 | −54 | −87 | −140 | −220 | −0.35 | −0.54 | −0.87 | −1.4 | −2.2 | −3.5 | −5.4 |

TABLE 2-continued

Limit deviations for shafts h
Upper limit deviation = es
Lower limit deviation = ei

| Basic size mm | | | | | | | | h | | | | | | | | | | | |
|---|---|---|---|---|---|---|---|---|---|---|---|---|---|---|---|---|---|---|---|
| Above | Up to and including | 1 | 2 | 3 | 4 | 5 | 6 | 7 | 8 | 9 | 10 | 11 | 12 | 13 | 14[1] | 15[1] | 16[1] | 17 | 18 |
| | | | | | | | | | Deviations | | | | | | | | | | |
| | | | | | | μm | | | | | | | | | | mm | | | |
| 120 | 180 | 0 / -3.5 | 0 / -5 | 0 / -8 | 0 / -12 | 0 / -18 | 0 / -25 | 0 / -40 | 0 / -63 | 0 / -100 | 0 / -160 | 0 / -250 | 0 / -0.4 | 0 / -0.63 | 0 / -1 | 0 / -1.6 | 0 / -2.5 | 0 / -4 | 0 / -6.3 |
| 180 | 250 | 0 / -4.5 | 0 / -7 | 0 / -10 | 0 / -14 | 0 / -20 | 0 / -29 | 0 / -46 | 0 / -72 | 0 / -115 | 0 / -185 | 0 / -290 | 0 / -0.46 | 0 / -0.72 | 0 / -1.15 | 0 / -1.85 | 0 / -2.9 | 0 / -4.6 | 0 / -7.2 |
| 250 | 315 | 0 / -6 | 0 / -8 | 0 / -12 | 0 / -16 | 0 / -23 | 0 / -32 | 0 / -52 | 0 / -81 | 0 / -130 | 0 / -210 | 0 / -320 | 0 / -0.52 | 0 / -0.81 | 0 / -1.3 | 0 / -2.1 | 0 / -3.2 | 0 / -5.2 | 0 / -8.1 |
| 315 | 400 | 0 / -7 | 0 / -9 | 0 / -13 | 0 / -18 | 0 / -25 | 0 / -36 | 0 / -57 | 0 / -89 | 0 / -140 | 0 / -230 | 0 / -360 | 0 / -0.57 | 0 / -0.89 | 0 / -1.4 | 0 / -2.3 | 0 / -3.6 | 0 / -5.7 | 0 / -8.9 |
| 400 | 500 | 0 / -8 | 0 / -10 | 0 / -15 | 0 / -20 | 0 / -27 [2] | 0 / -40 | 0 / -63 | 0 / -97 | 0 / -155 | 0 / -250 | 0 / -400 | 0 / -0.63 | 0 / -0.97 | 0 / -1.55 | 0 / -2.5 | 0 / -4 | 0 / -6.3 | 0 / -9.7 |
| 500 | 630 | 0 / -9 | 0 / -11 | 0 / -16 | 0 / -22 | 0 / -32 | 0 / -44 | 0 / -70 | 0 / -110 | 0 / -175 | 0 / -280 | 0 / -440 | 0 / -0.7 | 0 / -1.1 | 0 / -1.75 | 0 / -2.8 | 0 / -4.4 | 0 / -7 | 0 / -10.3 |
| 630 | 800 | | | | | | | | | | | | | | | | | | |
| 800 | 1 000 | 0 / -10 | 0 / -13 | 0 / -18 | 0 / -25 | 0 / -36 | 0 / -50 | 0 / -80 | 0 / -125 | 0 / -200 | 0 / -320 | 0 / -500 | 0 / -0.8 | 0 / -1.25 | 0 / -2 | 0 / -3.2 | 0 / -5 | 0 / -8 | 0 / -12.5 |
| 1 000 | 1 250 | | | | | | | | | | | | | | | | | | |
| 1 250 | 1 600 | 0 / -11 | 0 / -15 | 0 / -21 | 0 / -28 | 0 / -40 | 0 / -56 | 0 / -90 | 0 / -140 | 0 / -230 | 0 / -360 | 0 / -560 | 0 / -0.9 | 0 / -1.4 | 0 / -2.3 | 0 / -3.6 | 0 / -5.6 | 0 / -9 | 0 / -14 |
| 1 600 | 2 000 | | | | | | | | | | | | | | | | | | |
| 2 000 | 2 500 | 0 / -13 | 0 / -18 | 0 / -24 | 0 / -33 | 0 / -47 | 0 / -66 | 0 / -105 | 0 / -165 | 0 / -260 | 0 / -420 | 0 / -660 | 0 / -1.05 | 0 / -1.65 | 0 / -2.6 | 0 / -4.2 | 0 / -6.6 | 0 / -10.5 | 0 / -16.5 |
| 2 500 | 3 150 | 0 / -15 | 0 / -21 | 0 / -29 | 0 / -39 | 0 / -55 | 0 / -78 | 0 / -125 | 0 / -195 | 0 / -310 | 0 / -500 | 0 / -780 | 0 / -1.25 | 0 / -1.95 | 0 / -3.1 | 0 / -5 | 0 / -7.8 | 0 / -12.5 | 0 / -19.5 |
| | | 0 / -18 | 0 / -25 | 0 / -35 | 0 / -46 | 0 / -65 | 0 / -92 | 0 / -150 | 0 / -230 | 0 / -370 | 0 / -600 | 0 / -920 | 0 / -1.5 | 0 / -2.3 | 0 / -3.7 | 0 / -6 | 0 / -9.2 | 0 / -15 | 0 / -23 |
| | | 0 / -22 | 0 / -30 | 0 / -41 | 0 / -55 | 0 / -78 | 0 / -110 | 0 / -175 | 0 / -280 | 0 / -440 | 0 / -700 | 0 / -1 100 | 0 / -1.75 | 0 / -2.8 | 0 / -4.4 | 0 / -7 | 0 / -11 | 0 / -17.5 | 0 / -28 |
| | | 0 / -26 | 0 / -36 | 0 / -50 | 0 / -68 | 0 / -96 | 0 / -135 | 0 / -210 | 0 / -330 | 0 / -540 | 0 / -860 | 0 / -1 350 | 0 / -2.1 | 0 / -3.3 | 0 / -5.4 | 0 / -8.6 | 0 / -13.5 | 0 / -21 | 0 / -33 |

[1] Tolerance grades IT14 to IT16 (incl.) shall not be used for basic sizes less than or equal to 1 mm.
[2] The values given in the frame, for tolerance grades IT1 to IT5 (incl.), for basic sizes greater than 500 mm and less than or equal to 3 150 mm, are included for experimental use.

We claim:

1. A chain transmission comprising:

a driving sprocket, at least one driven sprocket, and an endless roller or bushing chain having rollers or bushings of uniform diameter in meshing engagement with said sprockets, in which:

each said sprocket has a plurality of teeth, with tooth gaps between successive teeth;

the successive teeth of each sprocket have facing front and back tooth surfaces which are continuous with, and connected to each other by, a tooth gap bottom, the front tooth surfaces facing in the direction of sprocket rotation;

the tooth form of each sprocket tooth of at least one of said sprockets has a portion at which the distance from the center line of the tooth to the front tooth surface, at a location radially outward from the pitch circle, is larger than or equal to the distance from the center line at the location of the pitch circle to the intersection of the pitch circle and said front tooth surface;

the root diameter df of said at least one of said sprockets, defined as the diameter of a circle tangent to the gap bottoms of the sprocket, is less than 250 mm, and if the difference between the diameter Dp of said pitch circle and the diameter d1 of said bushings or rollers is less than or equal to 127 mm, said root diameter df is less than Dp−d1−0.25 mm; and if the difference between the diameter Dp of said pitch circle and the diameter d1 of said bushings or rollers is greater than 127 mm but not greater than 250 mm, said root diameter df is less than Dp−d1−0.3 mm; and said chain transmission is incorporated into a timing drive of an automobile engine, including an engine crankshaft and an engine camshaft, wherein the driving sprocket is attached to said engine crankshaft and the driven sprocket is attached to said engine camshaft.

* * * * *

UNITED STATES PATENT AND TRADEMARK OFFICE
CERTIFICATE OF CORRECTION

| | | |
|---|---|---|
| PATENT NO. | : 7,635,314 B2 | Page 1 of 1 |
| APPLICATION NO. | : 11/269002 | |
| DATED | : December 22, 2009 | |
| INVENTOR(S) | : Kubo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Ninth Day of November, 2010

David J. Kappos
*Director of the United States Patent and Trademark Office*